United States Patent [19]

Hasler

[11] 4,385,333
[45] May 24, 1983

[54] MAGNETIC DISC DRIVE SYSTEM

[75] Inventor: Alfred Hasler, Mountain View, Calif.

[73] Assignee: International Memories, Inc., Cupertino, Calif.

[21] Appl. No.: 174,965

[22] Filed: Aug. 4, 1980

[51] Int. Cl.³ .............................................. G11B 17/02
[52] U.S. Cl. ..................................................... 360/97
[58] Field of Search .............................. 360/97, 98, 99

[56] References Cited

U.S. PATENT DOCUMENTS 4,054,931 10/1977 Bolton et al. .......................... 360/97
4,317,146 2/1982 Gervais .................................. 360/98

Primary Examiner—Robert S. Tupper
Attorney, Agent, or Firm—John L. McGannon

[57] ABSTRACT

A magnetic disc drive system having a pair of vertically spaced discs rotatably mounted in a compact housing provided with a cover for closing the housing. The cover has a duct extending along its inner surface for performing part of an air flow path through the housing. An impeller mounted above the upper discs rotates with the discs and generates the air flow which moves outwardly off the discs to keep the surfaces of the discs free of foreign particles. The air flow path extends downwardly past the discs and along the bottom of the housing and into a cavity which contains a filter which traps foreign particles. The upper end of the filter is coupled in a sealing relationship to one end of the duct to complete the air flow path. A number of read-write heads are mounted on a shiftable carriage and are coupled with the discs for movement back and forth along the discs in response to signals applied to a reversible motor coupled to the carriage. The drive motor for the discs has a brake on the bottom of the housing which is released during normal operation but which is applied to stop the discs when power is removed from the drive motor of the discs.

9 Claims, 9 Drawing Figures

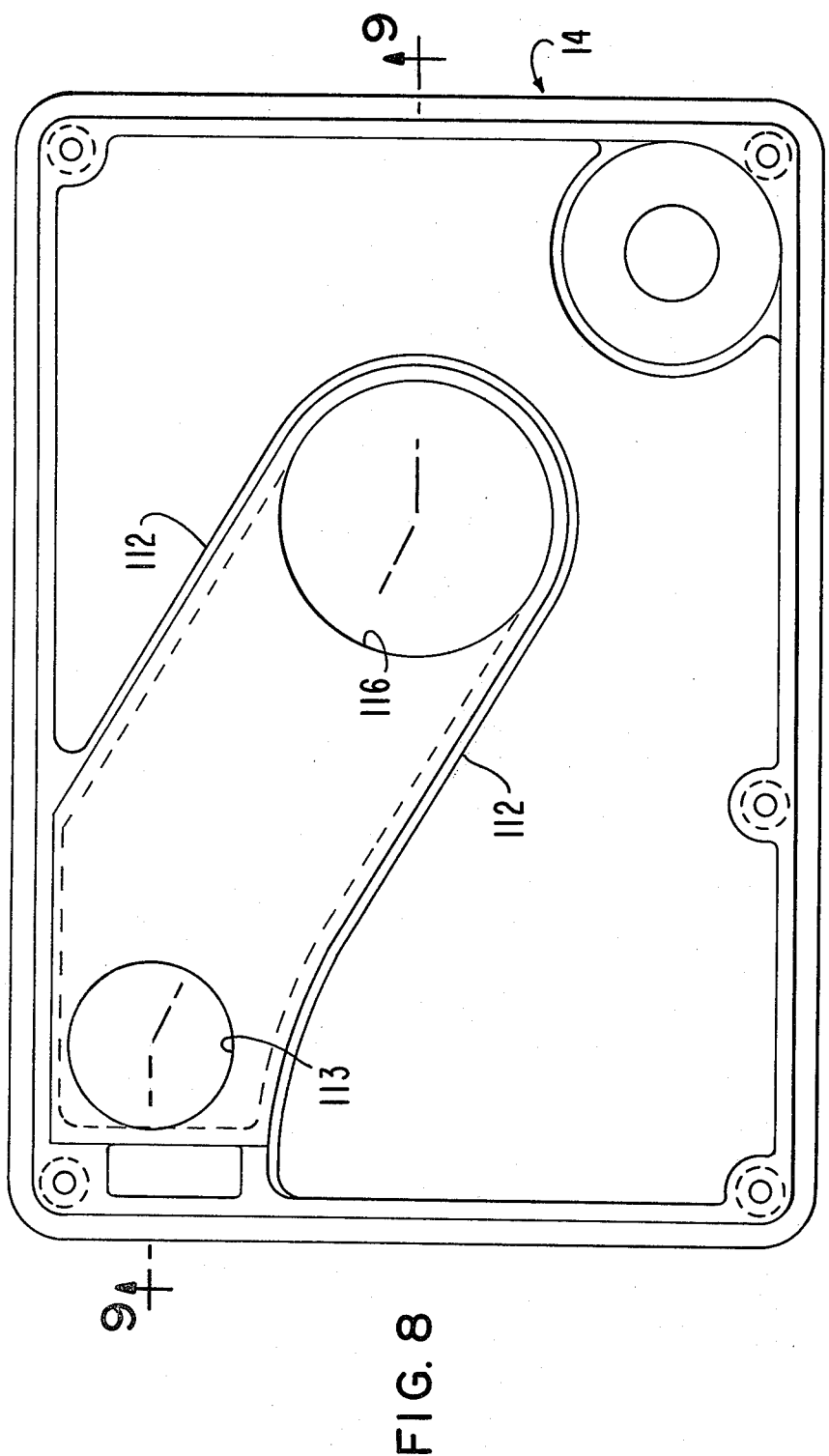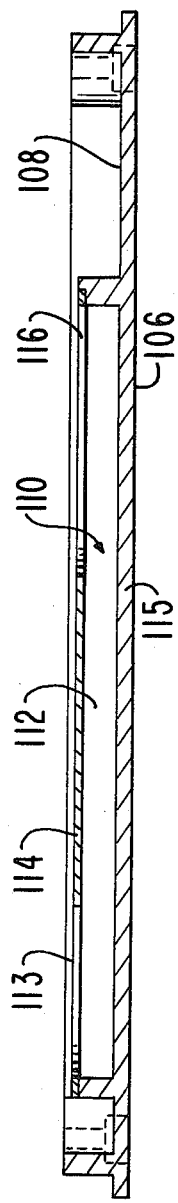
FIG. 8
FIG. 9

MAGNETIC DISC DRIVE SYSTEM

This invention relates to improvements in magnetic recording techniques and, more particularly, to an improved magnetic recording system using rigid, magnetic discs.

BACKGROUND OF THE INVENTION

Magnetic disc drive assemblies of the type using rigid discs generally have been made to use 8 inch discs. It is desirable, however, to provide a disc drive system having even smaller diameter discs without materially effecting the recording capability of the discs. Attempts have been made to reduce the size of floppy discs to about 5 inches in diameter. This disc size has been found to be especially adaptable in many applications where only limited space is available for the disc drive system. Because of the success of the 5 inch floppy discs, a need has arisen for an improved magnetic disc drive system which uses rigid discs with 5 inch diameters.

SUMMARY OF THE INVENTION

The present invention satisfies the aforesaid need by providing a drive system for one or more magnetic discs of 5 inch diameters wherein the system includes a housing which is extremely compact in size and shape. A cover is provided for closing and sealing the open top of the housing. The discs in the housing are spaced apart and have magnetic read-write heads carried by a head mount assembly on a shiftable carriage controlled by a reversible motor.

A main aspect of the invention is the air flow path through the housing past the discs to keep the discs free of foreign particles as the discs rotate in the housing. To this end, the cover has a duct along its lower surface which communicates with an impeller mounted above the upper disc. The impeller causes air to flow outwardly of the discs and then downwardly to and along the bottom of the housing and into a cavity containing a filter. The air flows upwardly through the filter and back into the duct so that the path is continuous. The filter removes the foreign particles from the air immediately upon rotation of the impeller so that the air flowing past the discs is substantially clean at all times.

The elements in the housing are arranged to make optimum use of the interior space of the housing especially the way in which the duct is carried by the cover. In this way, the housing can be made extremely small in size to allow the system to be hand-carried from place to place and to fit into small spaces.

The primary object of this invention is to provide a magnetic disc drive system in which the disc of the system can be relatively small in diameter, such as five inches, yet the disc can operate in an environment which is free of foreign particles and data signals can be accurately read from and written on the discs while the disc provides a high data recording capability.

Another object of the present invention is to provide a disc drive system of the type described wherein the system includes a housing having a top cover provided with a duct along its inner surface so that the duct and an impeller near the disc can form a part of a continuous air flow path in the housing with the path having a filter for trapping foreign particles as the impeller immediately commences to rotate, thereby assuring a clean operating environment for the disc.

Other objects of this invention will become apparent as the following specification progresses, reference being had to the accompanying drawings for an illustration of the invention.

In the drawings:

FIG. 8 is a bottom plan view of the cover for the open top of the housing of the system; and FIG. 9 is a cross-sectional view taken along line 9—9 of FIG. 8.

Figure 1:
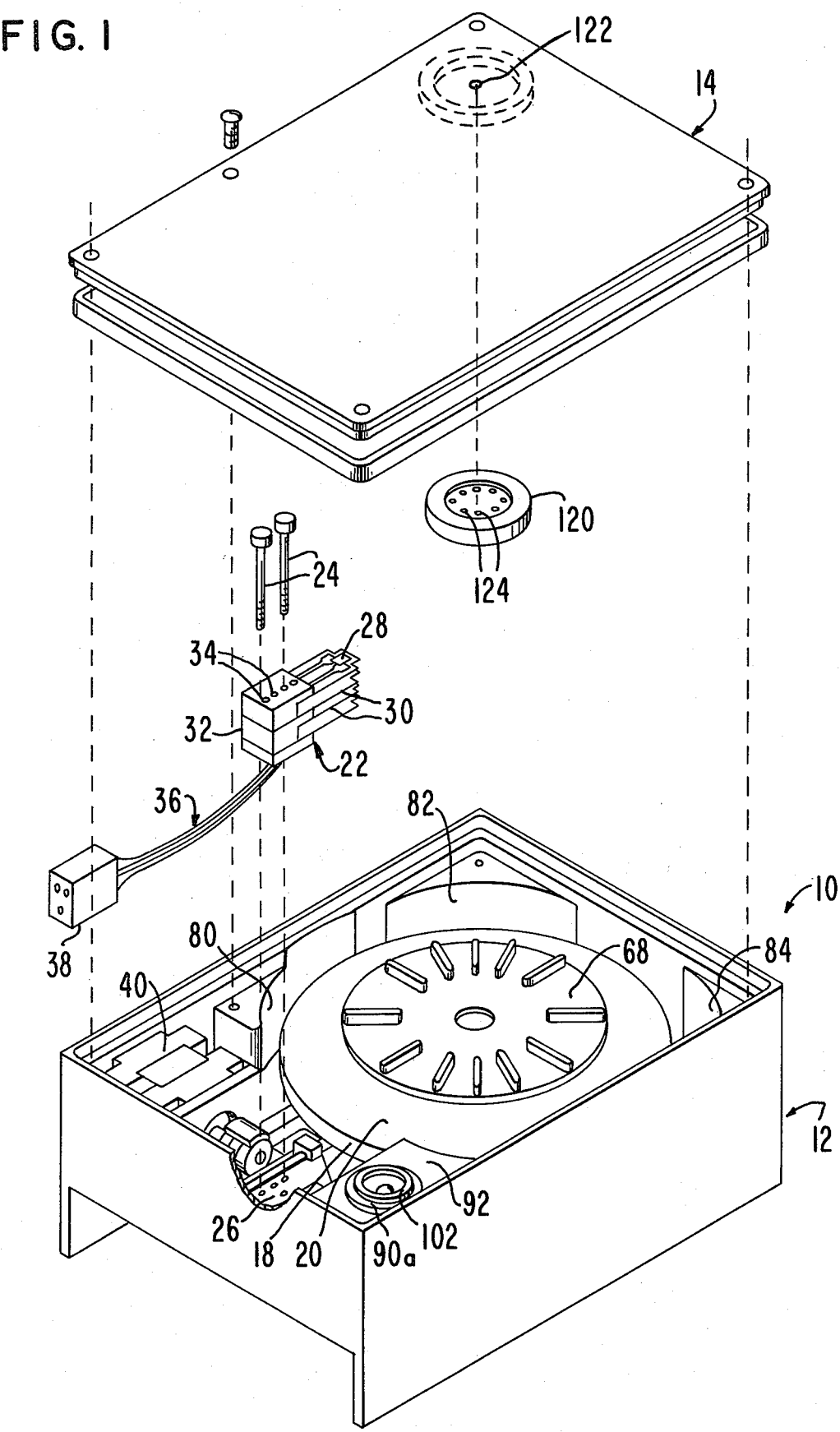
FIG. 1 is an exploded, perspective view of the improved disc drive system of the present invention.
Figure 3:
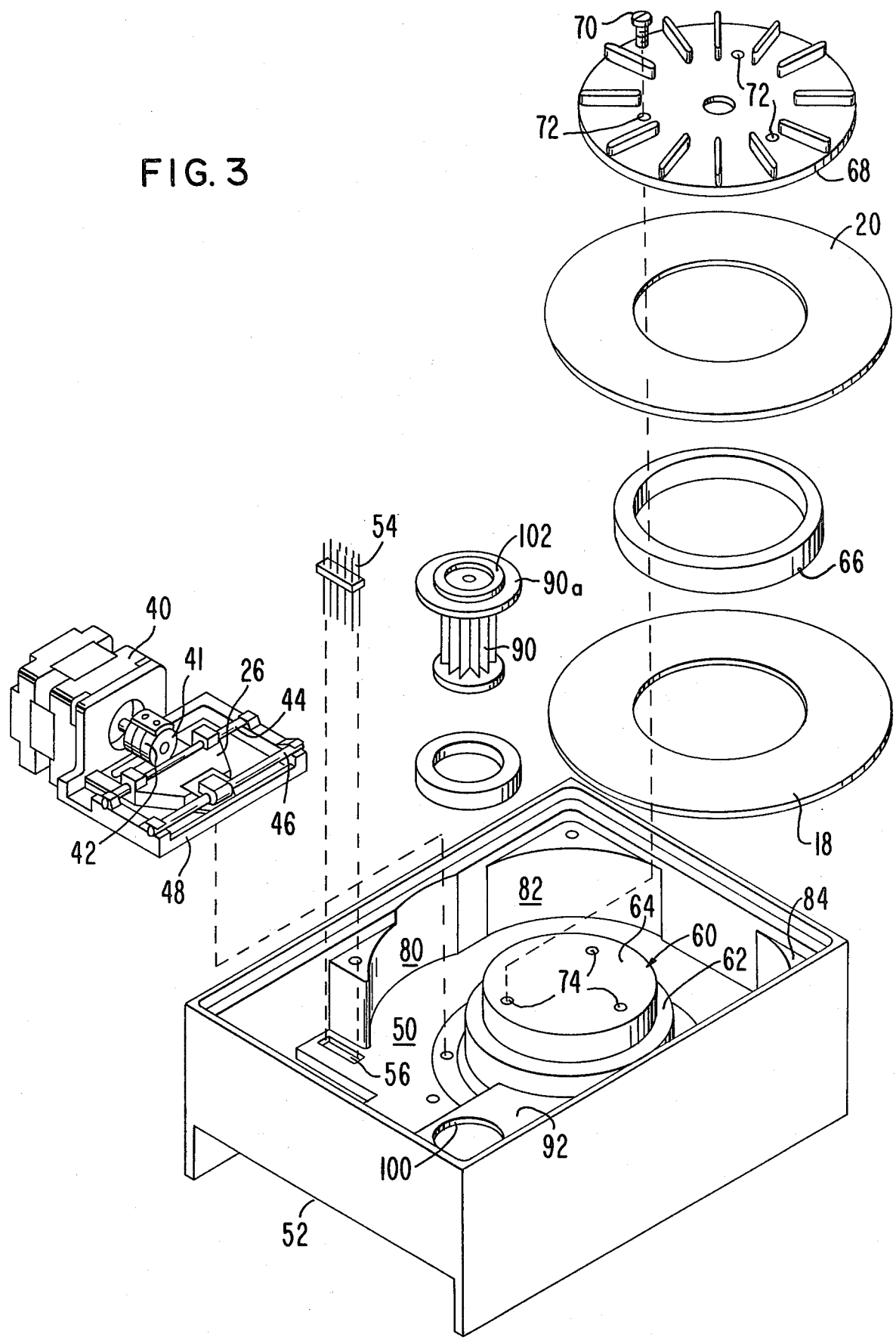
FIG. 3 is a perspective view similar to FIG. 1 but showing additional parts in exploded form with reference to the housing.

The improved disc drive system of the present invention is broadly denoted by the numeral 10 and is shown in FIGS. 1 and 3. System 10 includes a generally rectangular housing 12 having an open top which is closed by a cover 14 with the use of a continuous seal 16 engageable with the outer peripheral margins of the housing and the cover. In the housing, a pair of rigid magnetic recording discs 18 and 20 are mounted for rotation about a generally vertical axis with the discs spaced apart from each other. A head assembly 22 is secured by screws 24 to a shiftable carriage 26 mounted in the housing at one side of discs 18 and 20. Head assembly 22 includes a plurality of magnetic read-write heads 28 mounted on the outer ends of a number of flexible members 30 forming part of a head mount 32 having a holes 34 for receiving screws 24. An electrical cable 36 has a number of wires extending from a connector 38 to respective heads 28.

A motor 40 in a well 41 (FIG. 2) in housing 12 has a drive shaft 41 which is coupled by a flexible, metallic band 42 to carriage 26 for reciprocating the latter with reference to discs 18 and 20. The carriage is mounted for movement on a pair of rods 44 and 46 carried by a plate 48 secured to the bottom 50 of housing 12. A signal applied motor 40 causes it to be energized and to move carriage 26 in a corresponding direction. In this way, heads 28 are selectively moved radially of discs 18 and 20 and into magnetic coupled relationship thereto. Signals are applied to or sensed by the heads and these signals are transmitted by way cable 36 to the electronic of the system, such electronics typically being on circuit boards (not shown) carried in housing 12 in any suitable manner. For purposes of illustration, the circuit boards are housed in a recess 52 below the bottom 50 of the housing 12 (FIG. 3). Connector 38 is coupled to pins 54 (FIG. 3) which pass through an opening 56 in the bottom 50 of the housing, the pins being coupled to the electronics on the circuit boards in recess 52.

The discs 18 and 20 are secured to a hub 60 (FIG. 3) mounted in housing 12 for rotation through the central axes of the discs. Hub 60 is coupled with the drive motor (not shown) also carried by housing 12 below bottom 50 thereof. Hub 60 has a flat, annular surface 62 surrounding and spaced below an upper flat surface 64.

Disc 18 rests on surface 62 and an annular spacer 66 (FIG. 3) with flat end faces is between disc 18 and disc 20, the upper surface of disc 20 being substantially flush with surface 64. an impeller 68 is secured by screws 70 to hub 60 in engagement with upper surface 64 thereof to retain discs 18 and 20 in operative positions on the hub. Screws 70 pass through holes 72 in impeller 68 and the screws also pass through threaded holes 74 in hub 60. The impeller has a plurality of radial projections 76 near its outer periphery and these projections cause an air flow outwardly of the impeller as the impeller rotates with the hub. The air flow sweeps across disc 20 to keep the disc free of foreign matter. The air flow also passes across disc 18 and then down to and along bottom 50 for return to the impeller in a manner to be described.

Figure 2:
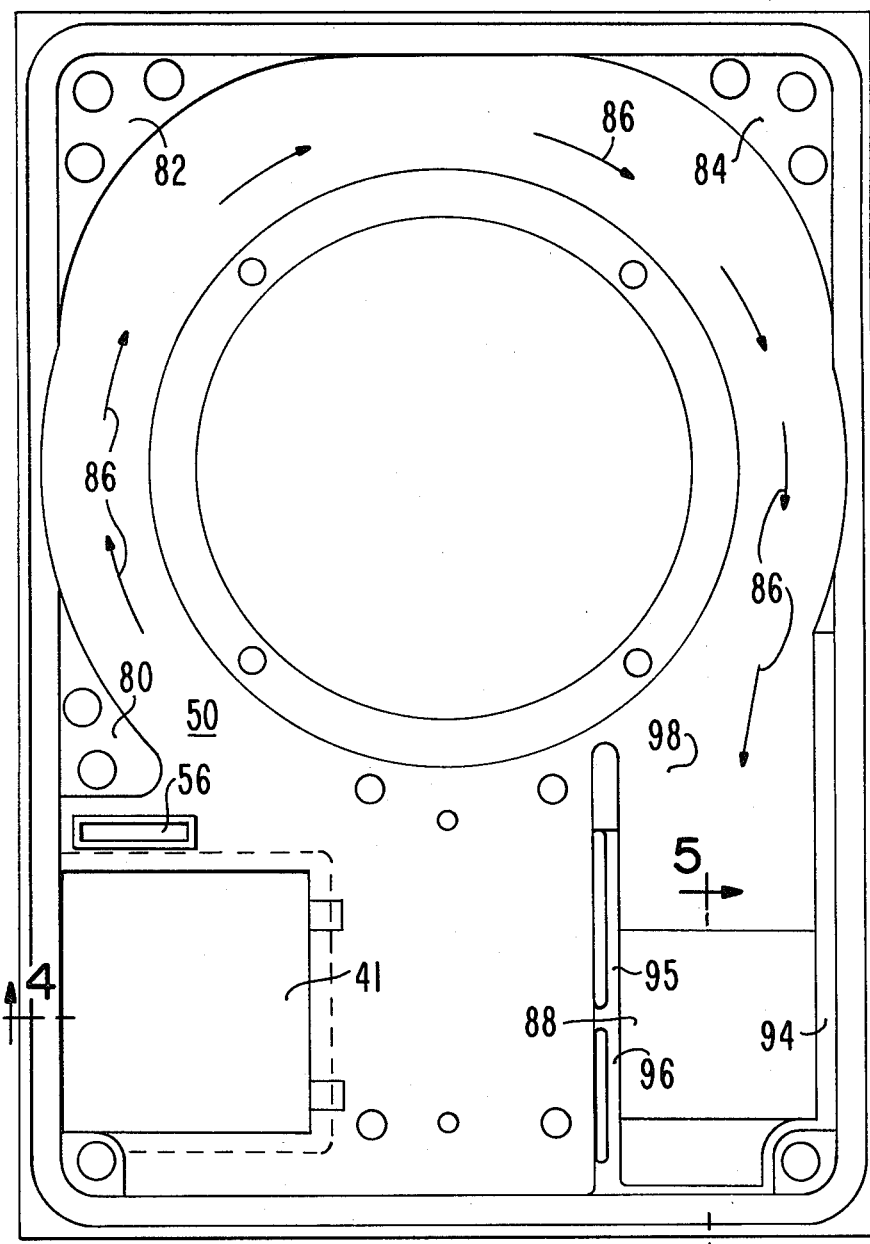
FIG. 2 is a top plan view of the housing for the disc drive system of FIG. 1.

The housing has internal, upright, curved surface portions in the manner shown in FIG. 2 and these surface portions near the outer pheripheries of the discs 18 and 20. The purpose of this feature is to keep the dimensions of the housing at a minimum so that it can accommodate discs having diameters of approximately five inches.

The curved surface portions are primarily formed by blocks 80, 82 and 84 (FIGS. 2 and 3) and the substantially circular line formed by the curved surface portions is just immediately inside the housing so that the housing can be of minimum dimensions yet be large enough to accommodate two five inch magnetic recording discs. The curvature also contributes to the streamlining of an air flow path which extends a major part of about the hub and is denoted by arrows 86. The air flow path extends into a cavity 88 (FIG. 3) and then upwardly into a duct along the bottom surface of cover 14 in a manner to be described with respect to FIGS. 8 and 9. The air passes through a filter 90 carried in cavity 88 so that any foreign particles in the air are trapped in the filter and retained thereby. Thus, such foreign particles will move in contact with the discs which would other cause errors in reading of data from the discs or writing of data onto the discs.

As shown in FIGS. 1 and 2, a top plate 92 is in covering relationship to the open top of cavity 88. To this end, top plate 92 is supported on a flange 94 on the adjacent side wall of the housing and on the top flat face 95 of an inner side wall 96 (FIG. 3) which is spaced inwardly from flange 94. This leaves the cavity 88 with an open side denoted by the numeral 98 for the flow of the air thereinto.

Figure 6:
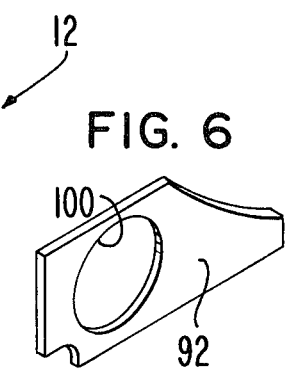
FIG. 6 is a perspective view of a panel for covering the upper end of a filter-receiving cavity in the housing.
Figure 4:
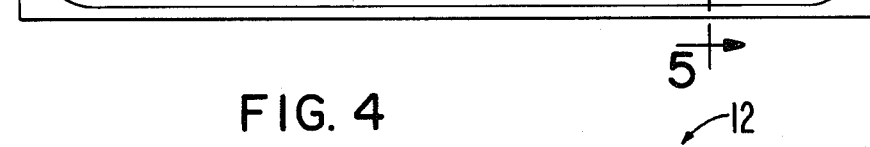
FIG. 4 is a cross-sectional view taken along line 4—4 of FIG. 2.
Figure 4:
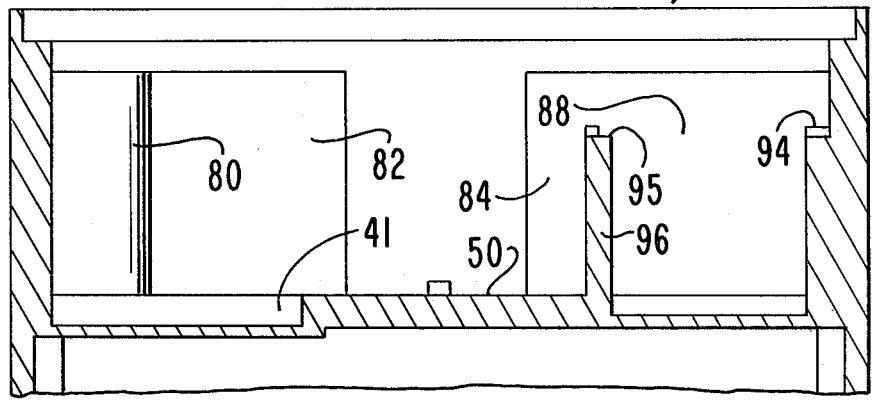
Figure 5:
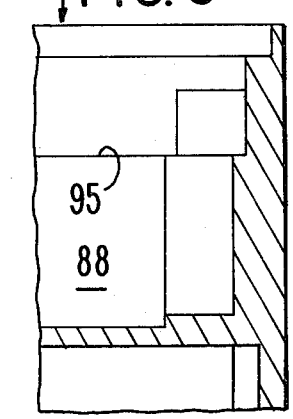
FIG. 5 is a cross-sectional view taken along line 5—5 of FIG. 2.

Plate 92 has an opening 100 (FIGS. 3 and 6) which receives filter 90, the upper flange 90a of the filter engaging the upper surface of plate 92 when the filter extends into cavity 88. A sealing ring 102 is carried on flange 90a and ring 102 engages the lower surface of cover 14 in sealing relationship therewith to assure that the air flow upwardly out of the filter and into the duct in the cover does not pass laterally into other parts of the housing.

Cover 14 as shown in FIGS. 8 and 9 had an outer surface 106 and and inner 108 (FIG. 9). A duct 110 is formed on the inner surface 108 of cover 14. This duct is defined by a pair of side walls 112, an inner wall 114 and the outer wall 115 forming the main part of the cover. Wall 114 spans the distance between the side walls 112. Wall 114 has openings 113 and 116. Opening 113, when cover 14 is mounted on the housing, is aligned with filter 90. Opening 116 is vertically aligned with the center of impeller 68 which is spaced below duct 110. Thus, the air flow passing upwardly through the filter, enters duct 110 through opening 113 and then passes through the duct to opening 116 and then downwardly onto the impeller. The air then is caused by the impeller to move laterally and outwardly along the impeller and across upper disc 20, then downwardly over lower disc 18 and then to the bottom 50 of the housing. The air flow then continues along bottom 50 in the path denoted by arrows 86 in FIG. 3 and the air enters the open end 98 of cavity 88 for flow once again upwardly through the filter. In this way, the air flow will cause any foreign particles to immediately enter the air flow and the air particles will be trapped by the filter. Thus, the air flow which passes the disc will essentially be clean so as to avoid any problems with reading and writing of data on the discs.

Cover 14 can be provided with a bleed member 120 (FIG. 1) carried by cover 14 to allow air to enter or to leave the interior of the house through a pin hole 122 in the cover 14 (FIG. 1). Bleed member 120 typically has holes 124 which allow the air to enter the housing. Member 120 also has filter material beneath holes 124 to trap any foreign particles coming in with the air.

In use, with the elements of system 10 assembled in the manner shown in FIG. 1 and with cover 14 and head assembly 22 in place, system 10 is operated by energizing the drive motor associated with discs 18 and 20 is energized to rotate the discs continuously in one direction. Then, signals are applied to motor 40 to shift heads 28 relative to the discs to read and write data. As the drive motor rotates the discs impeller 68 is rotated and causes an air flow to be generated and to be maintained in the housing past the discs, along bottom 50, in the cavity 88, through filter 90 and duct 110 and back to the impeller.

The rotation of the drive shaft of the motor can be braked by a brake member 130 (FIG. 7) carried on an arm 132 pivotally mounted by pin 134 on the bottom surface 136 of housing 12. A solenoid 138 having an armature 140 is coupled to a projection 142 on arm 132 to pull brake member 130 away from the outer pheripheral 144 of a second impeller 146 secured to the drive motor and beneath the latter. The impeller has projections 148 for blowing air in the direction of arrow 150 to cool the printed circuit boards carried by the housing.

Figure 7:
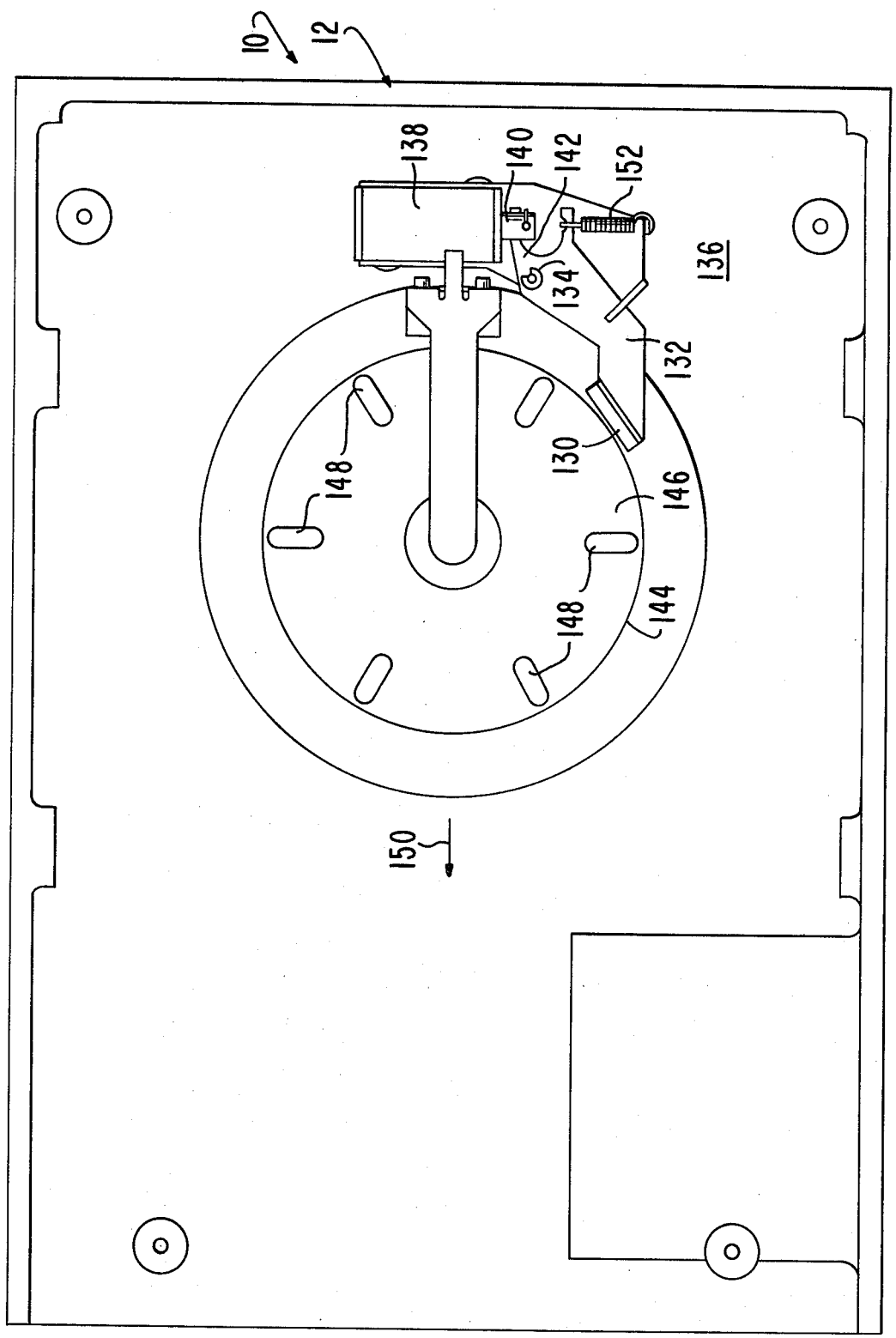
FIG. 7 is an enlarged, bottom plan view of the system showing a brake for the disc drive motor of the system.

Arm 132 is biased in a counter-clockwise direction when viewing FIG. 7 by a coil spring 152. Thus, when drive motor for the discs is not energized, brake member 130 is engaged with outer pheriphery 144 of impeller 146. When the drive motor is energized, solenoid 138 is also energized to cause brake member 130 to be pulled away from the impeller so that the drive motor can rotate uninterruptedly.

System 10 provides a compact unit which can be fitted into an extremely small space, such as a space normally occupied by the disc drives for floppy discs in computer installations. Its small size and its relatively lightweight construction allows it to be carried from place to place and to be used in many different operating environments. Because it is a sealed unit, the discs in system 10 are kept clean at all times and capable of providing precision data recording and retrieving with substantially no maintenance.

I claim:

1. A magnetic disc drive system comprising: a housing having a bottom and an open top; a magnetic recording disc in the housing; means in the housing for mounting the disc for rotation about the central axis of the disc; means coupled with the disc for rotating the same; a read-write head for the disc; means mounting the head in the housing for movement transversely of the disc and in magnetically coupled relationship thereto; means coupled with the head for moving the head relative to the disc; an impeller carried by the disc mounting means for rotation with the disc; a cover covering the open top of the housing in sealing relationship thereto; means defining a continuous air flow path within and through the housing and past the disc; and a filter across the air flow path and laterally spaced from the impeller for trapping foreign particles in the air flow, said filter having an entrance end near the bottom, said cover having a lower surface with a duct thereon for defining a part of said path defining means, said duct extending between the impeller and the filter for channelling the air flow therebetween, the air flow along said path extending toward and through the duct, past the rotating means and the disc, toward and along the upper surface of the bottom of the housing, and into and through the filter and into the duct.

2. A system as set forth in claim 1, the ends of the duct having respective openings therethrough, said housing having a cavity spaced from the impeller, said filter being in said cavity, one of the openings being vertically aligned with said cavity and the other opening being aligned with the central portion of the impeller.

3. A system as set forth in claim 2, wherein one end of the filter is in sealing relationship to the duct near said one opening thereof.

4. A system as set forth in claim 3, wherein said air flow path has a first, circular portion extending along the bottom of the housing and a second, generally rectilinear portion extending tangentially of the first portion and into said cavity of the housing.

5. A system as set forth in claim 1, wherein is included a brake coupled with said disc rotating means.

6. In a magnetic drive system: a housing having a bottom and an open top; a magnetic recording disc in the housing; means in the housing for mounting the disc for rotation about the central axis of the disc; an impeller carried by the disc mounting means for rotation with the disc; a cover covering the open top of the housing in sealing relationship thereto; means defining a continuous air flow path within and through the housing and past the disc; and a filter across the air flow path and laterally spaced from the impeller for trapping foreign particles in the air flow, the filter having an entrance end near said bottom, and cover having a lower surface with a duct thereon for defining a part of said path defining means, said duct extending between the impeller and the filter for channeling the air flow therebetween, the air flow along said path extending toward and through the duct, past the rotating means and the disc, toward and along the upper surface of the bottom of the housing, and into and through the filter and into the duct.

7. In a system as set forth in claim 6, the ends of the duct having respective openings therethrough, said housing having a cavity spaced from the impeller, said filter being in said cavity, one of the openings being aligned with the cavity of the path and the other opening being aligned with the central portion of the impeller.

8. A system as set forth in claim 7, wherein one end of the filter is in sealing relationship to the duct near said one opening thereof.

9. A system as set forth in claim 8, wherein said air flow path has a first, circular portion extending along the bottom of the housing and a second, generally rectilinear portion extending tangentially of the first portion and into said cavity of the housing.

* * * * *